United States Patent [19]

Urquhart et al.

[11] Patent Number: 4,818,454

[45] Date of Patent: Apr. 4, 1989

[54] METHOD OF MAKING CERAMIC COMPOSITE ARTICLES BY INVERSE SHAPE REPLICATION OF AN EXPENDABLE PATTERN

[75] Inventors: Andrew W. Urquhart, Newark; E. Allen LaRoche, Jr., Middletown, both of Del.

[73] Assignee: Lanxide Technology Company, LP, Newark, Del.

[21] Appl. No.: 206,999

[22] Filed: Jun. 13, 1988

Related U.S. Application Data

[63] Continuation of Ser. No. 907,919, Sep. 16, 1986, abandoned.

[51] Int. Cl.$^4$ ............................................. C04B 33/32
[52] U.S. Cl. ........................................ 264/59; 264/60; 264/82
[58] Field of Search ............... 264/57, 59, 60, 65, 264/82; 501/98, 127, 128

[56] References Cited

U.S. PATENT DOCUMENTS

| | | | |
|---|---|---|---|
| 2,741,822 | 4/1956 | Udy | 264/59 |
| 3,255,027 | 6/1966 | Talsma | 106/65 |
| 3,296,002 | 1/1967 | Hare | 106/10 |
| 3,298,842 | 1/1967 | Seufert | 106/65 |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,538,231 | 11/1970 | Newkirk et al. | 373/117 |
| 3,789,096 | 1/1974 | Church | 264/60 |
| 3,864,154 | 2/1975 | Gazza et al. | 264/60 |
| 3,973,977 | 8/1976 | Wilson | 106/62 |
| 4,055,451 | 10/1977 | Cockbain et al. | 264/60 |
| 4,647,414 | 3/1987 | Mizuno et al. | 264/65 |
| 4,657,876 | 4/1987 | Hillig | 264/60 |

FOREIGN PATENT DOCUMENTS

| | | |
|---|---|---|
| 0116809 | 8/1984 | European Pat. Off. |
| 0155831 | 9/1985 | European Pat. Off. |
| 0169067 | 1/1986 | European Pat. Off. |

OTHER PUBLICATIONS

"Oxidation of Molten Aluminum Alloys. Reaction with Refractories" by M. Drouzy and M. Richard—Mar. 1974—Fonderie, France, No. 332, pp. 121-128.
"Refractories for Aluminum Alloy Melting Furnaces" by B. Clavaud and V. Jost, Sep. 1980—Trans. Lillian Brassinga, Jan. 1985.

Primary Examiner—Ivars Cintins
Attorney, Agent, or Firm—Mark G. Mortenson; William E. McShane

[57] ABSTRACT

There is disclosed a method of producing a self-supporting ceramic composite body having therein at least one cavity which inversely replicates the geometry of an expendable pattern. The method includes the steps of surrounding the expendable pattern with a filler material to thereby form a filled cavity within the filler material. The expendable pattern is chemically or physically removed from the filler material and a quantity of a parent metal is put into the cavity. The parent metal is heated to a temperature above its melting point and an oxidation reaction process begins whereby the oxidation reaction product infiltrates and embeds the surrounding filler material. Excess filler material and/or excess parent metal are removed, thus resulting in a self-supporting ceramic composite body having a cavity in the shape of the expendable pattern.

27 Claims, 1 Drawing Sheet

METHOD OF MAKING CERAMIC COMPOSITE ARTICLES BY INVERSE SHAPE REPLICATION OF AN EXPENDABLE PATTERN

This is a continuation of co-pending application Ser. No. 907,919 filed on Sept. 16, 1986, now abandoned.

BACKGROUND OF THE INVENTION

1. Field of the Invention

The present invention broadly relates to methods of making ceramic composite bodies having one or more shaped cavities therein. In particular, the invention relates to methods of making ceramic composite bodies comprising a polycrystalline ceramic matrix infiltrating a bed of filler and having at least one cavity of selected geometry formed by inversely replicating the shape of an expendable pattern.

2. Background and Description of Commonly Owned Patent Applications

The subject matter of this application is related to that of copending and commonly owned U.S. patent application Ser. No. 823,542, filed Jan. 27, 1986 entitled "Inverse Shape Replication Method of Making Ceramic Composite Articles and Articles Obtained Thereby" in the name of Marc S. Newkirk et al. This copending application discloses a novel oxidation method for producing a self-supporting ceramic composite body having therein at least one cavity which inversely replicates the geometry or shape of the parent metal precursor as the positive pattern. thus, the resulting composite product has a cavity of a predetermined geometry. This application is discussed in greater detail below. Composites generally utilizing the same oxidation phenomeon, but having no defined or predetermined configuration, are disclosed in copending and Commonly owned patent application Ser. No. 819,397, filed Jan. 17, 1986, which is a continuation-in-part of Ser. No. 697,876, filed Feb. 4, 1985, both in the name of Marc S. Newkirk et al and entitled "Composite Ceramic Articles and Methods of Making Same." These copending applications disclose a novel method for producing a self-supporting ceramic composite by growing an oxidation reaction product from a parent metal into a permeable mass of filler.

The method of growing a ceramic product by this oxidation reaction is disclosed generally in copending commonly owned U.S. patent application Ser. No. 818,943 filed Jan. 15, 1986 as a continuation-in-part of Ser. No. 776,964, filed Sept. 17, 1985, which is a continuation-in-part of Ser. No. 705,787, filed Feb. 26, 1985, which is a continuation-in-part of Ser. No. 591,392, filed Mar. 16, 1984, all in the name of Marc S. Newkirk et al and entitled "Novel Ceramic Materials and Methods of Making the Same." These applications disclose the method of producing self-supporting ceramic bodies grown as the oxidation reaction product of a parent metal precursor which may be enhanced by the use of an alloyed dopant. Molten parent metal is reacted with a vapor-phase oxidant to form the oxidation reaction product. In the appropriate temperature range, molten metal is progressively drawn through the oxidation reaction product and into contact with the oxidant thereby continuing to form additional oxidation reaction product and developing the ceramic body. The method was improved upon by the use of external dopants applied to the surface of the precursor parent metal as disclosed in commonly owned U.S. application Ser. No. 822,999, filed Jan. 27, 1986, which is a continuation-in-part of Ser. No. 776,965, filed Sept. 17, 1985, which is a continuation-in-part of Ser. No. 747,788, filed June 25, 1985, which is a continuation-in-part of Ser. No. 632,636, filed July 20, 1984, all in the name of Marc S. Newkirk et al and entitled "Methods of Making Self-Supporting Ceramic Materials".

The entire disclosures of each of the foregoing commonly owned patent applications, which are assigned to the same owner, are expressly incorporated hereby by reference.

There is an increased interest in substituting ceramics for metals because, with respect to certain properties, ceramics are superior to metals. There are, however, several known limitations or difficulties in making this substitution such as scaling versatility, capability to produce complex shapes, satisfying the properties required for the end use application, and costs. The above-described commonly owned patent applications overcome these limitations or difficulties and provide novel methods for reliably producing ceramic materials, including composites.

The invention described in commonly owned patent application Ser. No. 823,542 (identified above) ameliorates the difficulties in formation of ceramic bodies having shapes with complicated internal cavities and especially shapes with re-entrant cavities. Conventional or known methods for making ceramic products with such shapes by compacting and inserting particles are not readily applicable, because the internal pattern required to establish the desired part geometry cannot be easily removed after the body is formed around it. While such part geometries can sometimes be prepared by machining or grinding the desired shape from green preform or finished ceramic blank, this approach is undesirable because of the high costs of machining and grinding operations, especially when applied to ceramic materials. In many cases such geometries cannot presently be produced at all, even by machining or grinding.

The invention described in commonly owned patent application Ser. No. 823,542 provides shaped cavity-containing ceramic bodies typically of high strength and fracture toughness by a mechanism which is more direct, more versatile and less expensive than conventional approaches. The invention described therein also provides means for reliably producing cavity-containing ceramic bodies of a size and thickness which is difficult or impossible to duplicate with the presently available technology. Briefly, the invention therein described involves embedding a shaped parent metal precursor within a conformable filler, and infiltrating the filler with a ceramic matrix obtained by oxidation of the parent metal to form a polycrystalline material consisting essentially of the oxidation reaction product of said parent metal with an oxidant and optionally, one or more metallic constituents. More particularly, in practicing the invention, the parent metal is shaped to provide a pattern, and then is surrounded by a conformable filler wihch inversely replicates the geometry of the shaped parent metal. In this method, the filler (1) is permeable to the oxidant when required as in the case where the oxidant is a vapor-phase oxidant and, in any case, is permeable to infiltration by the developing oxidation reaction product; (2) has sufficient conformability over the heat-up temperature interval to accommodate the differential thermal expansion between the filler and the parent metal plus any melting-point volume change of the metal; and (3) at least in a support zone thereof enveloping the pattern, is intrinsically self-bonding, whereby said filler has sufficient cohesive strength to retain the inversely replicated geometry within the bed upon migration of the parent metal as described below. The surrounded shaped parent metal is heated to a temperature region above its melting point but below the melting point of the oxidation reaction product to form a body of molten parent metal. The molten parent metal is reacted in that temperature region or interval with the oxidant to form the oxidation reaction product. At least a portion of the oxidation reaction product is maintained in that temperature region and in contact with and between the body of molten and the oxidant, whereby molten metal is progressively drawn from the body of molten metal through the oxidation reaction product, concurrently forming the cavity as oxidation reaction product continues to form within the bed of filler at the interface between the oxidant and previously formed oxidation reaction product. This reaction is continued in that temperature region for a time sufficient to at least partially embed the filler within the oxidation reaction product by growth of the latter to form the composite body having the aforesaid cavity therein. Finally, the resulting self-supporting composite body is separated from excess filler, if any.

SUMMARY OF THE INVENTION

The present invention provides an alternative method for producing shaped, cavity-containing ceramic bodies. An expendable or disposable pattern is surrounded or embedded with a quantity of filler material. The pattern is then eliminated and replaced by a quantity of parent metal, and the oxidation reaction proceeds with the resulting oxidation reaction product infiltrating the filler material as described above in connection with the commonly owned patent application. The geometry of the cavity inversely replicates the geometry of the pattern.

In more detail, the method comprises shaping a disposable or expendable pattern of any suitable material such as plastic, foam, or wax. The expandable pattern is packed within or surrounded with a bed of conformable filler material to inversely replicate the geometry of the expendable pattern in the bed. The pattern is then eliminated, as for example, by vaporization, and replaced with a quantity of parent metal, preferably molten. The bed and the body of parent metal containing within it are then heated to a process temperature above the melting point of the parent metal but below the melting point of the oxidation reaction product. In this temperature interval, the molten parent metal reacts with an oxidant, e.g., a vapor-phase oxidant, to form the oxidation reaction product. At least a portion of the oxidation reaction product is maintained in contact with and between the body of molten metal and the oxidant, and molten metal is progressively drawn from the body of molten metal through the oxidation reaction product toward said bed of filler to concurrently form the cavity in said bed of filler as oxidation reaction product continues to form at the interface between the oxidant and previously formed oxidation reaction product. The reaction is continued for a time sufficient to at least partially infiltrate or embed the filler within the oxidation reaction product by growth of the latter to form a composite body having a cavity therein. Where desired, the boundaries of the filler bed may be provided with a barrier means to substantially inhibit or prevent growth there beyond so as to facilitate achieving a net shape to the ceramic composite body. The resulting self-supporting composite body is separated from excess filler and/or parent metal, if any.

The bed of filler material is characterized by being permeable to the oxidant when required as in the case when the oxidant is a vapor-phase oxidant, and being permeable to infiltration by the developing oxidation reaction product. The expendable pattern, which is packed in the filler material, may be removed as by vaporization, solution, melting and draining, or the like, prior to adding the parent metal to the cavity. Metal is then added to the resulting cavity either as molten metal, or as a solid and then melted in place. In another embodiment, the molten parent metal is poured onto the expendable pattern to vaporize the pattern. Where desired, the bed of filler material possesses some temporary bonding strength to maintain the desired shape in the cavity. The oxidation reaction process is then conducted to form the composite.

Generally, it is relatively easy to shape an expendable pattern material. For example, expendable pattern materials such as expanded polystyrene can be extruded, molded, or injection molded with relative ease, and therefore it is possible to produce by the present invention ceramic composites with cavities having a complicated or intricate cavity geometry or shape.

The product of this invention is a self-supporting ceramic composite body having therein a cavity which inversely replicates the shape or geometry of the expendable pattern and comprises a ceramic matrix having filler incorporated therein. The matrix consists essentially of a polycrystalline oxidation reaction product having interconnected crystallites formed upon oxidation of the parent metal precursor, and optionally metallic constituents or pores or both.

The materials of this invention can be grown with substantially uniform properties through their cross section to a thickness heretofore difficult to achieve by conventional processes for producing dense ceramic structures. The process which yields these materials also obviates the high costs associated with conventional ceramic production methods, including fine, high purity, uniform powder preparation: green body forming: binder burnout: sintering or hot pressing and/or hot isostatic pressing. The products of the present invention are adaptable or fabricated for use as articles of commerce which, as used herein, is intended to include, without limitation, industrial, structural and technical ceramic bodies for such applications where electrical, wear, thermal, structural or other features or properties are important or beneficial, and is not intended to include recycled or waste materials such as might be produced as unwanted by-products in the processing of molten metals.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents derived from the parent metal, or reduced from the oxidant or a dopant, most typically within a range of from about 1–40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product of reaction of one or more metals with an oxidant such as those described in this application.

"Oxidant" means one or more suitable electron acceptors or electron sharers and may be a solid, a liquid, or a gas (vapor) or some combination of these (e.g., a solid and a gas) at the process conditions.

"Pattern material" refers to disposable or expendable materials such as plastics, foams, and waxes which can be extruded, molded, cast, machined, or otherwise shaped for establishing the geometry of the cavity, and also which can be chemically or physically removed from the bed of filler material while leaving the cavity formed thereby substantially intact.

"Parent metal" as used in this specification and the appended claims refers to that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

"Cavity" means broadly an unfilled space within a mass of body, and is not limited to any specific configuration of the space.

DETAILED DESCRIPTION OF THE INVENTION AND PREFERRED EMBODIMENTS THEREOF

Figure 1:
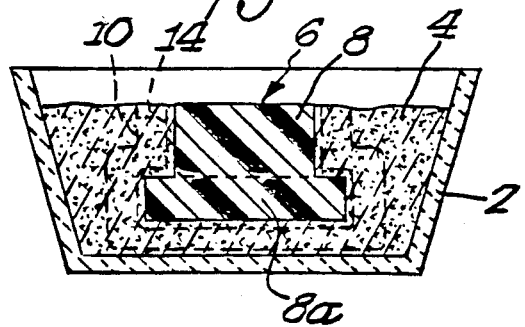
FIG. 1 is a schematic, cross-sectional view in elevation showing an assembly of a pattern material surrounded by a bed of particulate filler and confined within a refractory vessel.

In the practice of the present invention, a quantity of a pattern material is provided in the form of an expendable pattern, the geometry of which is to be inversely replicated as a cavity within the finished ceramic composite. By following the practices of the present invention, complex shapes can be inversely replicated within the finished ceramic composite during formation or growth of the ceramic, rather than by shaping or machining a ceramic body. The term "inversely replicated" means that the cavity in the ceramic composite attained by the invention process is defined by interior surfaces of the ceramic composite which are congruent to the shape of the expendable pattern. The pattern material may be suitably shaped by any appropriate means; for example, a quantity of an expendable pattern material may be suitably molded, extruded, cast, machined or otherwise shaped. The pattern may have grooves, bores, recesses, lands, bosses, flanges, studs, screw threads and the like formed therein as well as having collars, bushings, discs, bars, or the like assembled thereto to provide patterns of virtually any desired configuration. The pattern may be hollow or may comprise one or more unitary pieces suitably shaped so that when surrounded within a conformable bed of filler, the pattern material defines a shaped cavity within the bed and occupies the cavity within the mass of filler.

When the expendable pattern material is eventually replaced by a quantity of parent metal which is melted under oxidation reaction conditions, a shaped cavity develops in the resulting ceramic composite body. Thus, in one aspect, the present invention provides the advantage of making the cavity shape by molding, extruding, casting or machining an expendable pattern material such as a plastic foam rather than by forming, grinding or machining a ceramic, or by shaping the parent metal precursor as taught in the aforesaid commonly owned patent application Ser. No. 823,542.

The pattern materials which may be used in the present invention include those materials which have been used in conventional expendable mold casting techniques. Although various expendable grade waxes or wax blends are suitable for certain embodiments, expanded plastics and foams are preferred. More preferably, polystyrenes, polyethylenes, and polyurethanes are used as the pattern materials.

The pattern material may be shaped by conventional processes including injection molding, blow molding, extrusion, casting, machining and the like. Injection molding is currently preferred for making large numbers of patterns. Blow molding also may be preferred in other embodiments for its ability to produce hollow expendable molds. Blow molding may be particularly desirable because it minimizes the amount of expendable material in order to facilitate a more rapid evacuation of the cavity.

The expendable material may be eliminated or evacuated from the cavity by various methods. In one embodiment, the expendable pattern material may be vaporized by evaporation or combustion prior to the addition of the parent metal precursor. In alternative embodiments, the pattern material may be removed by melting and allowing the material to drain from the cavity. Any residue can be burned out as in a prefiring step. The expendable pattern also may be dissolved by chemical means, and any residue washed from the cavity by use of a suitable solvent.

In still other alternative embodiments, the pattern material is left in place until a quantity of molten parent metal is poured directly into the cavity. When the molten parent metal contacts the pattern, the material is vaporized and thus eliminated from the cavity. In this way, molten parent metal concomitantly replaces the evacuating pattern material thereby reducing the chance of disturbing or upsetting the bed of filler. As a result, the filler material is more likely to retain the shape of the cavity.

Depending on the desired method of replacing the pattern material with the parent metal, the parent metal may be added in either molten or solid form, e.g., powder, particulate granules or pieces. The use of a molten parent metal is preferred because it completely fills the cavity at or near the temperature at which the oxidation reaction will occur. In addition, when the parent metal is in a molten state, a fresh surface of the parent metal is available for the oxidation reaction process, i.e. the surface is free of surface oxides, etc. Where desired, the filler bed and expendable pattern may be placed in a furnace at or near the process temperature, and molten parent metal added to expel the pattern. In this manner, as molten metal is added and displaces the pattern which is being vaporized, the oxidation reaction begins and infiltration of the bed occurs. In alternative embodiments, the pattern is first displaced, and then the parent metal is poured into the cavity. A powdered or granulated parent metal may be desirable in some embodiments because interstices in the powdered or granulated mass as a whole would accommodate thermal expansion of the metal. Also, parent metal in powdered or granulated form, when added to the cavity, would conform readily to the shape of the cavity in the bed of filler material.

Although the invention is described below in detail with specific reference to aluminum as the preferred parent metal, other suitable parent metals which meet the criteria of the present invention include, but are not limited to, silicon, titanium, tin, zirconium and hafnium.

A solid, liquid or vapor-phase (gas) oxidant, or a combination of such oxidants, may be employed. For example, typical oxidants include, without limitation, oxygen, nitrogen, a halogen, sulphur, phosphorus, arsenic, carbon, boron, selenium, tellurium, and compounds and combinations thereof, for example, silica (as a source of oxygen), methane, ethane, propane, acetylene, ethylene, and propylene (as a source of carbon), and mixtures such as air, $H_2/H_2O$ and $CO/CO_2$, the latter two being useful in controlling the oxygen activity of the environment.

Although any suitable oxidants may be employed, specific embodiments of the invention are described below with reference to use of vapor-phase oxidants. If a gas or vapor oxidant, i.e., a vapor-phase oxidant, is used the filler is permeable to the vapor-phase oxidant so that upon exposure of the bed of filler to the oxidant, the vapor-phase oxidant permeates the bed of filler to contact the molten parent metal therein. The term "vapor-phase oxidant" means a vaporized or normally gaseous material which provides an oxidizing atmosphere. For example, oxygen or gas mixtures containing oxygen (including air) are preferred vapor-phase oxidants, as in the case where aluminum is the parent metal and aluminium oxide the desired reaction product, with air usually being more preferred for obvious reasons of economy. When an oxidant is identified as containing or comprising a particular gas or vapor, this means an oxidant in which the identified gas or vapor is the sole, predominant or at least a significant oxidizer of the parent metal under the conditions obtaining in the oxidizing environment utilized. For example, although the major constituent of air is nitrogen, the oxygen content of air is the normally sole oxidizer for the parent metal because oxygen is a significantly stronger oxidant than nitrogen. Air therefore falls within the definition of an "oxygen-containing gas" oxidant but not within the definition of a "nitrogen-containing gas" oxidant. An example of a "nitrogen-containing gas" oxidant as used herein and in the claims is "forming gas", which contains 96 volume percent nitrogen and 4 volume percent hydrogen.

When a solid oxidant is employed, it is usually dispersed through the entire bed of filler in the form of particulates admixed with the filler, or perhaps as coatings on the filler particles. Any suitable solid oxidant may be employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product is aluminum boride.

In some instances, the oxidation reaction may proceed so rapidly with a solid oxidant that the oxidation reaction product tends to fuse due to the exothermic nature of the process. This occurrence can degrade the microstructural uniformity of the ceramic body. This rapid exothermic reaction can be avoided by mixing into the composition relatively inert fillers which exhibit low reactivity. Such fillers absorb the heat of reaction to minimize any thermal runaway effect. An example of such a suitable inert filler is one which is identical to the intended oxidation reaction product.

If a liquid oxidant is employed, the entire bed of filler or a portion thereof adjacent the molten metal is coated or soaked as by imersion in the oxidant to impregnate the filler. Reference to a liquid oxidant means one which is a liquid under the oxidation reaction conditions, and so a liquid oxidant may have a solid precursor, such as a salt, which is molten at the oxidation reaction conditions. Alternatively, the liquid oxidant may have a liquid precursor, e.g., a solution of a material, which is used to impregnate part or all of the filler and which is melted or decomposed at the oxidation reaction conditions to provide a suitable oxidant moiety. Examples of liquid oxidants as herein defined include low melting glasses.

The filler material utilized in the practice of the invention may be one or more of a wide variety of materials suitable for the purpose. As used herein and in the claims, when speaking of surrounding the expendable pattern with the filler material, it is intended to refer to packing or embedding the filler material around the expendable pattern, or laying the filler material up against the expendable pattern. The filler material should substantially conform to the geometry of the expendable pattern. For example, if the filler comprises particulate material such as fine grains or powders of a refractory metal oxide, the pattern is surrounded by the filler so that the pattern defines a filled cavity (filled or occupied by the pattern). However, it is not necessary that the filler be in fine particulate form. For example, the filler may comprise wire, fibers, hollow bodies, spheres, bubbles, pellets, platelets or aggregate, or whiskers, or such materials as metal wool, wires, or refractory fiber cloth. The filler also may comprise either a heterogeneous or homogeneous combination of two or more such components or geometric configurations, e.g., a combination of small particulate grains and whiskers. It is necessary only that the physical configuration of the filler be such as to permit the expendable pattern to be surrounded by or within a mass of the filler with the filler closely conforming to the surfaces of the pattern. The cavity ultimately formed in the ceramic composite is the negative of the geometry of the pattern material. This material initially forms a (filled) cavity within the bed of conformable filler, the cavity being initially shaped and filled by the pattern material.

The filler material useful in the practice of the invention is one which, under the oxidation reaction conditions of the invention, is permeable when the oxidant is a vapor-phase oxidant, to passage therethrough of the oxidant. In any case, the filler also is permeable to the growth or development therethrough of oxidation reaction product. Where desired, the filler also has at the temperature at which the oxidation reaction is conducted, sufficient cohesive strength formed or developed, so as to retain the geometry inversely replicated therein by conformance of the filler to the pattern material as the pattern material is replaced by the parent metal.

It is desirable to perform the method of the present invention in such a way so as to minimize the time between the evacuation of the expendable pattern from the cavity and the point at which the reaction product has formed in the filler material to produce a shell of sufficient strength to maintain the shape of the cavity. However, there will be a transition period, though brief, when the shape of the cavity is not maintained by the pattern material or the reaction product. Thus, the filler material desirably possesses at least some capacity to self-bond so as to maintain the shape of the cavity by the filler material alone. Otherwise, either the force of gravity on the filler or a pressure differential between the developing cavity and the process atmosphere could cause the cavity to collapse inwardly as it is evacuated by the parent metal.

One method of maintaining the geometry of the cavity is to use a self-bonding filler which, at the appropriate temperature, either intrinsically sinters and bonds or can be made to sinter or otherwise bond by appropriate additives or surface modifications of the filler. For example, a suitable filler for use with an aluminum parent metal utilizing an air oxidant comprises alumina powder with an added silica bonding agent as fine particles or coatings on the alumina powder. Such mixtures of materials will partially sinter or bond at or below the oxidation reaction conditions under which the ceramic matrix will form. Without the silica additive, the alumina particles require substantially higher temperatures for bonding.

Another suitable class of fillers includes particles or fibers which, under the oxidation reaction conditions of the process, form a reaction product skin on their surfaces which tends to bond the particles in the desired temperature range. An example of this class of filler in the case where aluminum is employed as the parent metal and air as the oxidant, is fine silicon carbide particles (e.g., 500 mesh and finer), which form a silicon dioxide skin bonding themselves together in the appropriate temperature range for the aluminum oxidation reaction.

In alternative embodiments, the geometry of the cavity can be maintained during the transition period by use of an organic binder material which will be evacuated from the filler material at or below the oxidation reaction temperature.

It is not necessary that the entire mass or bed of filler comprise a sinterable or self-bonding filler or contain a sintering or bonding agent, although such arrangement is within the purview of the invention. The self-bonding filler and/or the bonding or sintering agent may be dispersed only in that portion of the bed or filler adjacent to and surrounding the expendable pattern of parent metal to a depth sufficient to form upon sintering or otherwise bonding an encasement of the developing cavity which is of sufficient thickness and mechanical strength to prevent collapse of the cavity (and consequent loss of fidelity of its shape in the grown ceramic body to the shape of the expendable pattern) before a sufficient thickness of the oxidation reaction product is attained. Thus, it suffices if a "support zone" of filler enveloping the pattern comprises a filler which is inherently sinterable or self-bonding within the appropriate temperature range or contains a sintering or bonding agent which is effective within the appropriate temperature range.

As used herein and in the claims, a "support zone" of filler is that thickness of filler enveloping the pattern which, upon bonding, is at least sufficient to provide the structural strength necessary to retain the replicated geometry of the expendable pattern material until the growing oxidation reaction product becomes self-supporting against cavity collapse. The size of the support zone of filler will vary depending on the size and configuration of the pattern and the mechanical strength attained by the sinterable or self-bonding filler in the support zone. The suport zone may extend from the surface of the pattern material into the filler bed for a distance less than that to which the oxidation reaction product will grow or for the full distance of growth. In fact, in some cases the support zone may be quite thin. For example, although the support zone of filler may be a bed of filler encasing the pattern material and itself encased within a larger bed of non-self-bonding or non-sinterable filler, the support zone may in suitable cases comprise only a coating of self-bonding or sinterable particles adhered to the expendable pattern by a suitable adhesive or coating agent. An example of this coating technique is given below.

In any case, the filler should not sinter, fuse or react in such a way as to form an impermeable mass so as to block the infiltration of the oxidation reaction product therethrough or, when a vapor-phase oxidant is used, passage of such vapor-phase oxidant therethrough. Any sintered mass which does form should not form at such a low temperature as to fracture due to an expansion mismatch between the pattern material and the filler before the vaporization temperature is reached.

As noted previously, a bonding or sintering agent may be included as a component of the filler in those cases where the filler would not otherwise have sufficient inherent self-bonding or sintering characteristics to prevent collapse of the cavity being formed into the volume formerly occupied by the expendable pattern. This bonding agent may be dispersed throughout the filler or in the support zone only. Suitable materials for this purpose include organo-metallic materials which under the oxidizing conditions required to form the oxidation reaction product will at least partially decompose and bind the filler sufficiently to provide the requisite mechanical strength. The binder should not interfere with the oxidation reaction process or leave undesired residual by-products within the ceramic composite product. Binders suitable for this purpose are well known in the art. For example, tetraethylorthosilicate is exemplary of suitable organometallic binders, leaving behind at the oxidation reaction temperature a silica moiety which effectively binds the filler with the requisite cohesive strength.

It is presently preferred to pre-heat the bed of filler material before the parent metal is added thereto. In this way, thermal shock to the bed can be avoided. It may be most effective to heat the bed of filler material to the same or higher temperature of the molten parent metal which is poured into the cavity. After the pattern material has been replaced by the parent metal in the cavity, the set-up of the parent metal and bed in an oxidizing environment is maintained at an oxidation reaction temperature above the melting point of the metal but below the melting point of the oxidation reaction product. As mentioned, the parent metal may be added to the cavity in the form of a powder, particles or pieces. In that event, the set-up is heated above the melting point of the metal thus producing a body or pool of molten metal.

On contact with the oxidant, the molten metal will react to form a layer of oxidation reaction product. Upon continued exposure to the oxidizing environment, within an appropriate temperature region, the remaining molten metal is progressively drawn into and through the oxidation reaction product in the direction of the oxidant and into the bed of filler and, on contact with the oxidant, forms additional oxidation reaction product. At least a portion of the oxidation reaction product is maintained in contact with and between the molten parent metal and the oxidant so as to cause continued growth of the polycrystalline oxidation reaction product in the bed of filler, thereby embedding filler within the polycrystalline oxidation reaction product. The polycrystalline matrix material continues to grow so long as suitable oxdiation reaction conditions are maintained.

The process is continued until the oxidation reaction product has infiltrated or embedded the desired amount of filler. The resulting ceramic composite product includes filler embedded by a ceramic matrix comprising a polycrystalline oxidation reaction product and including, optionally, one or more non-oxidized constituents of the parent metal or voids, or both. Typically in these polycrystalline ceramic matrices, the oxidation reaction product crystallites are interconnected in more than one dimension, preferably in three dimesnions, and the metal inclusions or voids may be at least partially interconnected. When the process is not conducted beyond the exhaustion of the parent metal, the ceramic composite obtained is dense and essentially void-free. When the process is taken to completion, that is, when as much of the metal as possible under the process conditions has been oxidized, pores in the place of the interconnected metal will have formed in the ceramic composite. The resulting ceramic composite product of this invention possesses a cavity of substantially the original dimensions and geometric configuration of the original expendable pattern.

Figure 2:
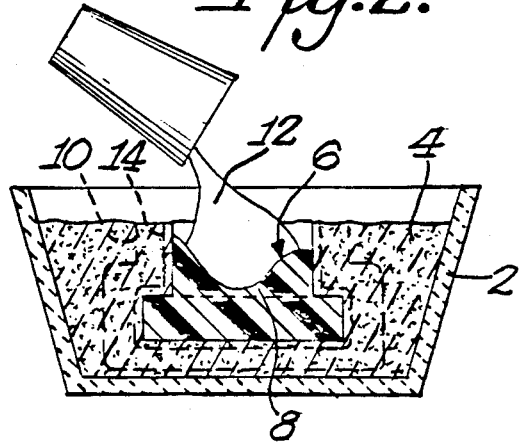
FIG. 2 is a perspective view similar to FIG. 1 showing the addition of a parent metal to the cavity.

Referring now to the drawings, FIG. 1 shows a refractory vessel 2, such as an alumina vessel, containing a bed of filler 4 which surrounds a pattern, indicated generally by 6, of any suitable material such as polystyrene. As shown in FIGS. 1 and 2, pattern 6 has a center section 8, which is generally cylindrical in configuration, joined by an end section 8a which is axially shorter but of greater diameter than center section 8. In this embodiment, the filler is retained by a suitable barrier means 10, such as a stainless steel screen or perforated steel cylinder which also establishes the boundaries of the ceramic body. Alternatively, the barrier may comprise a plaster of paris mold or calcium silicate mold typically applied as a slurry to a substrate such as cardboard and then allowed to set. The barrier thus defines the boundary or perimeter of the ceramic body by inhibiting growth of the oxidation reaction product therebeyond.

The pattern material 6, if foam, may be replaced by the parent metal by pouring molten parent metal 12 directly onto the pattern 6 in the cavity. In this way, the pattern material is vaporized and exits the cavity either through the bed of filler material, through the same port through which the parent metal was added, or through a separate venting port (not shown) if the port through which the parent metal is added is relatively small.

In an alternative embodiment, the expendable pattern is removed in a step prior to adding the molten parent metal. This may be accomplished by melting the pattern and draining the melted material from the cavity, but also can be accomplished by placing the assembly in a furnace which is heated to a point at which the expendable material is vaporized or burned. As mentioned above, the pattern material may also be removed by other techniques, such as dissolving the pattern, mechanically removing the pattern, etc.

After the parent metal is added to the cavity, the assembly is heated to a temperature sufficient to melt the metal, if it was not added in a molten state. Thereafter, a sufficiently high temperature is maintained whereby a vapor-phase oxidant, which permeates the bed of filler 4, and is in contact with the molten metal, oxidizes the molten metal, and growth of the oxidation reaction product resulting therefrom infiltrates the surrounding bed of filler 4.

For example, when the parent metal is an aluminum parent metal and air is the oxidant, the oxidation reaction temperature may be from about 850° C. to about 1450° C., preferably from about 900° C. to about 1350° C., and the oxidation reaction product is typically alpha-alumina. The molten metal migrates through the forming skin of oxidation reaction product from the volume formerly occupied by pattern material 6, thereby forming the composite with a cavity replicating the shape of the pattern.

Figure 3:
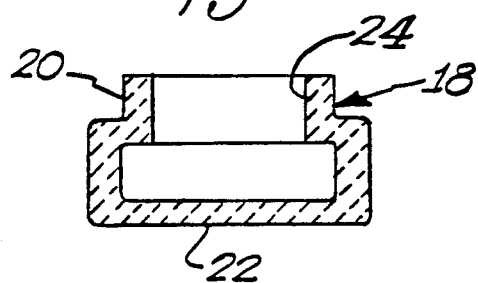
FIG. 3 is a cross-sectional view of a ceramic composite body of FIG. 1 made in accordance with the invention.

In certain embodiments, it may be desirable to place a quantity of the filler material over the port after the parent metal is added to the cavity. A closed cavity would thus be formed. In such embodiments, or even in some cases without placing filler material over the port, the migration of the parent metal can result in a pressure drop within that volume, as in the case of a closed cavity, due to impermeability to the surrounding atmosphere of the growing skin of oxidation reaction product in the bed of filler material and the skin of oxidation reaction product forming on top of the pool of molten metal. Thus a net external pressure acts on the container-like skin of oxidation reaction product. However, in a preferred embodiment the bed of filler 4 (or a support zone thereof) enveloping pattern 6 is intrinsically self-bonding at or above a self-bonding temperature which preferably lies close to but below the oxidation reaction temperature. Thus, upon being heated to its self-bonding temperature the filler, or a support zone thereof, has sintered or otherwise bonded to itself and attached to the growing oxidation reaction product sufficiently to afford adequate strength to the filler surrounding the developing cavity, i.e., the support zone of filler, to resist the pressure differential and thereby retain within the bed of filler 4 the geometry of the cavity formed therein by conformance of the filler to the shape of pattern 6. Representing an embodiment in which only a support zone of filler 4 contains or comprises a sinterable or self-bonding filler or a bonding or sintering agent, dotted line 14 in FIG. 1 indicates the extent of the support zone in the bed of filler 4. As the reaction continues, the cavity within bed 4 is partially or substantially entirely evacuated by the migration of molten parent metal through the oxidation reaction product to the outer surface thereof where it contacts the vapor-phase oxidant and is oxidized to form additional oxidation reaction product. The oxidation reaction product comprises a polycrystalline ceramic material which may contain inclusions therein of unoxidized constituents of the molten parent metal. Upon completion of the reaction, any remaining liquid metal within the cavity may be eliminated by decanting it if growth of a thick reaction product layer over the entry port has been prevented (as by using a barrier or inhibitor). Alternatively the assembly may be allowed to cool and any excess metal solidified and removed in a subsequent step such as acid leaching. The resultant ceramic composite, whose dimensions are indicated by the barrier 10, in FIG. 1, is separated from excess filler, if any, left within vessel 2. Such excess filler or part thereof may form a coherent mass or body because of the sintering or self-bonding, and this coherent mass may be removed from the ceramic composite which it encases by grit blasting, grinding, or the like. An economical technique is to employ grit blasting utilizing grit particles of a material which is suitable as the filler or as a component of the filler so that the removed filler and grit may be reused as filler in a subsequent operation. It is important to recognize that the degree of strength of the self-bonded filler used to prevent cavity collapse during processing is typically much less than the strength of the resulting composite. Hence, it is in fact quite feasible to remove excess self-bonded filler by rapid grit blasting without significant concern for damaging the resultant composite. In any case, the ceramic composite structure having the cavity formed therein may be further shaped by machining or grinding or otherwise forming to a desired outer shape. In the example illustrated in FIG. 3, the ceramic composite 18 has the shape of a circular cylinder having an outer surface 20, end face 22 and cavity 24 which is defined by surfaces congruent to the surfaces of pattern 6. Thus, the shape of cavity 24 is an inverse replication of the shape of expendable pattern 6. For many applications, the ceramic body may be utilizable as formed following removal of the excess, unentrained filler, without further requirement for grinding or machining.

By selecting an appropriate filler and maintaining the oxidation reaction conditions for a time sufficient to evacuate substantially all the molten parent metal from the filled cavity initially occupied by the pattern material 6, a faithful inverse replication of the geometry of pattern 6 is attained by cavity 16. While the illustrated shape of pattern 6 (and therefore of cavity 16) is relatively simple, cavities can be formed within the ceramic composite which inversely replicate with fidelity the shapes of much more complex geometry than that of pattern 6 by the practices of the present invention. The outer surfaces of the ceramic composite may be shaped by placing a barrier means at the desired locations to prevent growth therebeyond; in addition the surfaces may be ground or machined or otherwise formed to any desired size or shape consistent with the size and shape of the cavity 16 formed therein.

It should be understood that the filler properties of being permeable, conformable, and self-bonding (where desired) as described above are properties of the overall composition of the filter, and that individual components of the filler need not have any or all of these characteristics. Thus, the filler may comprise either a single material, a mixture of particles of the same material but of different mesh size, or mixtures of two or more materials. In the latter case, some components of the filler may, for example, not be sufficiently self-bonding or sinterable at the oxidation reaction temperature but the filler of which it is a component part will have the self-bonding or sintering characteristics at and above it self-bonding temperature because of the presence of other materials. A large number of materials which make useful fillers in the ceramic composite by imparting desired qualities to the composite also will have the permeable, conformable and self-bonding qualities described above. Such suitable materials will remain unsintered or unbonded sufficiently at temperatures below the oxidation reaction temperature so that the filler which surrounds the pattern can accommodate thermal expansion and any melting point volume change of the pattern material and yet may sinter or otherwise self-bond only upon attaining a self-bonding temperature which preferably lies close to and below the oxidation reaction temperature, sufficiently to impart the requisite mechanical strength to prevent collapse of the forming cavity during the initial stages of growth or development of the oxidation reaction product. Suitable fillers iclude, for example, silica, silicon carbide, alumina, zirconia, and combinations thereof.

As further embodiment of the invention and as explained in the commonly owned patent applications, the addition of dopant materials to the metal can favorably influence the oxidation reaction process. The function or functions of the dopant can depend upon a number of factors other than the dopant material itself. These factors include, for example, the particular parent metal, the end product desired, the particular combination of dopants when two or more dopants are used, the concentration of the dopant, the oxidizing environment, and the process a conditions.

The dopant or dopants may be provided as alloying constituents of the parent metal or may be applied to the filler or to a part of the filler bed, e.g., the support zone of the filler, or both. In the case of the second technique, where a dopant or dopants are applied to the filler, the application may be accomplished in any suitable manner, such as by dispersing the dopants through out part or the entire mass of filler as coatings or in the particulate form, preferably including at least a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A convenient manner of applying any of the dopant material is to merely soak the entire bed in a liquid source (e.g., a solution) of dopant material. A source of the dopant may also be provided by placing a rigid body of dopant in contact with and between at least a portion of the expendable pattern surface and the filler bed. For example, a thin sheet of silica-containing glass (useful as a dopant for the oxidation of an aluminum parent metal) can be placed upon a surface of the expendable pattern. When the expandable pattern is replaced by a quantity of molten aluminum parent metal (which may also be internally doped) and the resulting assemblage is heated in an oxidizing environment (e.g. in the case of aluminum in air, between about 850° C. to about 1450° C. or preferably about 900° C. to about 1350° C.), growth of the polycrystalline ceramic material into the permeable bed occurs. In the case where the dopant lies between the parent metal and the bed of filler material, the polycrystalline oxide structure generally grows within the permeable filler substantially beyond the dpoant layer (i.e., to beyond the depth of the applied dopant layer). In any case, one or more of the dopants may be externally applied to the expendable pattern surface and/or to the permeable bed. Additionally, dopants alloyed within the parent metal may be augmented by dopant(s) applied to the filler bed. Thus, any concentration deficiencies of the dopants alloyed within the parent metal may be augmented by an additional concentration of the respective dopant(s) applied to the bed, and vice versa.

Useful dopants for an aluminum parent metal, particularly with air as the oxidant, include, for example, magnesium and zinc, especially in combination with other dopants as described below. These metals, or a suitable source of the metals, may be alloyed into the aluminum-based parent metal at concentrations for each of between about 0.1-10% by weight based on the total weight of the resulting doped metal. The concentration for any one dopant will depend on such factors as the combination of dopants and the process temperature. Concentrations within the appropriate range appear to initiate the ceramic growth, enhance metal transport and favorably influence the growth morphology of the resulting oxidation reaction product.

Other dopants which are effective in promoting polycrystalline oxidation reaction product growth especially, aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloyng material to be added at a lower temperature.

Additional examples of dopant materials useful with an aluminum parent metal, include sodium, lithium, calcium, boron, phosphorous and yttrium which may be used individually or in combination with one or more dopants depending on the oxidant and process conditions. Sodium and lithium may be used in very small amounts in the parts per million range, typically about 100-200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to alloy any dopant material into the parent metal. For example, selectively applying one or more dopant materials in a thin layer to either all, or a portion of, the surface of the expendable pattern enables local ceramic growth from the parent metal or portions thereof and lends itself to growth of the polycrystalline ceramic material into the permeable filler in selected areas. Thus, growth of the polycrystalline ceramic material into the permeable bed can be controlled by the localized placement of the dopant material upon the surface of the expendable pattern. The applied coating or layer of dopant is thin relative to the intended thickness of ceramic composite, and growth or formation of the oxidation reaction product into the permeable bed extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the expendable pattern. The dopant material may, but need not, include either organic or inorganic binders, vehicles, solvents, and/or thickeners. More preferably, the dopant materials are applied as powders to the surface of the expandable pattern or dispersed through at least a portion of the filler. One particularly preferred method of applying the dopants to the parent metal surface is to utilize a liquid suspension of the dopants in a water/organic binder mixture sprayed onto an expendable pattern surface in order to obtain an adherent coating which facilitates handling of the expendable pattern prior to processing.

The dopant materials when used externally are usually applied to at least a portion of a surface of the expendable pattern metal as a uniform coating thereon. The quantity of dopant is effective over a wide range relative to the amount of parent metal to be reacted, and, in the case of aluminum, experiments have failed to identify either upper or lower operable limits. For example, when utilizing silicon in the form of silicon dioxide externally applied as a dopant for an aluminum-magnesium parent metal using air or oxygen as the oxidant, quantities as low as 0.00003 gram of silicon per gram of parent metal, or about 0.0001 gram of silicon per square centimeter of parent metal surface on which the $SiO_2$ dopant is applied, are effective. It also has been found that a ceramic structure is achievable from an aluminum-silicon parent metal using air or oxygen as the oxidant by using MgO as a dopant in an amount greater than about 0.0008 gram of Mg per gram of parent metal to be oxidized and greater than about 0.003 gram of Mg per square centimeter of parent metal surface upon which the MgO is applied.

A barrier means may be used in conjunction with the filler material to inhibit growth or development of the oxidation reaction product beyond the barrier, especially when vapor-phase oxidants are employed in the formation of the ceramic body. Suitable barrier means may be any material, compound, element, composition, or the like, which, under the process conditions of this invention, maintains some integrity, is not volatile, and preferably is permeable to the vapor-phase oxidant while being capable of locally inhibiting, poisoning, stopping, interfering with, preventing, or the like, continued growth of oxidation reaction product. Suitable barriers for use with aluminum parent metal include calcium sulfate (Plaster of Paris), calcium silicate, and Portland cement, and mixtures thereof, which typically are applied as a slurry or paste to the surface of the filler material. These barrier means also may include a suitable combustible or volatile material that is eliminated on heating, or a material which decomposes on heating, in order to increase the porosity and permeability of the barrier means. Still further, the barrier means may include a suitable refractory particulate to reduce any possible shrinkage or cracking which otherwise may occur during the process. Such a particulate having substantially the same coefficient of expansion as that of the filler bed is especially desirable. For example, if the preform comprises alumina and the resulting ceramic comprises alumina, the barrier may be admixed with alumina particulate, desirably having a mesh size of about 20–1000, but may be still finer. Other suitable barriers include a stainless steel screen, refractory ceramics or metal sheaths which are open on at least one end or the walls perforated to permit a vapor-phase oxidant (if used) to permeate the bed and contact the molten parent metal.

The ceramic composite structures obtained by the practice of the present invention will usually be a relatively dense, coherent mass wherein between about 5% and about 98% by volume of the total volume of the composite structure is comprised of one or more of the filler components which are embedded within a polycrystalline ceramic matrix. The polycrystalline ceramic matrix is usually comprised of, when the parent metal is aluminum and air or oxygen is the oxidant, about 60% to about 99% by weight (of the weight of polycrystalline matrix) of interconnected alpha-alumina and about 1% to 40% by weight (same basis) of non-oxidized metallic constituents, such as from the parent metal.

The invention is further illustrated by the following non-limiting examples.

EXAMPLE 1

A styrofoam cup, about 7.5 cm long and having a base diameter of about 4.5 cm and a wall thickness of 0.3 cm, was coated with a mixture of 95% silica and 5% clay by applying a water slurry of the silica and clay to the cup (just short of the open end thereof) and heating to dryness. The coating thickness was about the same as the wall thickness of the cup. The coated cup was buried in a bed of loose wollastonite with the end of the coating essentially flush with the exposed surface of the bed.

The cup was filled with molten 380.1 aluminum alloy (vaporizing the styrofoam) and the metal/bed assembly placed in a hot furnace where it was heated at 1000° C. for 48 hours.

The resulting ceramic body was removed from the wollastonite bed, the residual molten aluminum alloy decanted, and the product allowed to cool, leaving a ceramic cup having an internal surface which replicated in detail the external surface of the styrofoam cup. The external surface of the ceramic was defined by the wollastonite barrier surrounding the original coated pattern. The wall of the ceramic cup was comprised of an alumina ceramic which had grown through the thickness of the silica/clay coating.

EXAMPLE 2

The procedure described in Example 1 was repeated with the exception that alumina particles (Norton 38 Alundum of 70% 220 and 30% 500 mesh particle size) was substituted for the wollastonite, and the assembly was heated for 72 hours. In this case, the alumina matrix grew through the thickness of the silica/clay coating and, into the surrounding alumina particles, forming a wall measuring up to about 0.6 cm. Again the internal surface of the ceramic composite replicated the external surface of the styrofoam cup pattern.

Although only a few exemplary embodiments of the invention have been described in detail above, those skilled in the art will readily appreciate that the present invention embraces many combinations and variation other than those exemplified.

What is claimed is:

1. A method for producing a self-supporting ceramic composite body having therein at least one cavity which inversely replicates the geometry of a pattern, said composite body comprising a ceramic matrix obtained by oxidation of a parent metal to form a polycrystalline material comprising an oxidation reaction product of said parent metal with an oxidant, and a filler infiltrated by said ceramic matrix, the method comprising the steps of:

(a) providing an expendable pattern material;
 (b) packing said pattern material within a bed of conformable filler to inversely replicate therein the geometry of said pattern material, said bed of filler being characterized by (1) being permeable to said oxidant under the process conditions in step (c) and being permeable to infiltration by the growth of the oxidation reaction product through said filler, and (2) at least in a support zone thereof enveloping said pattern material having sufficient cohesive strength under the process conditions in step (c) to retain the inversely replicated geometry within said bed;
 (c) replacing said pattern material with a quantity of parent metal and maintaining a temperature above the melting point of said parent metal but below the melting point of said oxidation reaction product to maintain a body of molten parent metal and, at said temperature,
   (1) reacting the molten parent metal with said oxidant to form said oxidation reaction product,
   (2) maintaining at least a portion of said oxidation reaction product in contact with and between said body of molten metal and said oxidant, to progressively transport molten metal from said body of molten metal through the oxidation reaction product and into said bed of filler to concurrently form said cavity in said bed of filler as oxidation reaction product continues to form at the interface between said oxidant and previously formed oxidation reaction product, and
   (3) continuing said reacting for a time sufficient to at least partially infiltrate said filler with said oxidation reaction product by growth of the latter to form said composite body having said cavity therein; and
 (d) recovering the resulting self-supporting composite body.

2. The method of claim 1 wherein the pattern material is replaced by being vaporized upon contact with molten parent metal poured onto said pattern material.

3. The method of claim 1 wherein said pattern material is removed from said bed before said pattern material is replaced by said parent metal.

4. The method of claim 3 wherein said quantity of parent metal added is molten.

5. The method according to any of claims 1, 3 or 4 including removing said pattern material by chemical or physical means, preheating said bed of filler to a temperature at or above the temperature of said molten parent metal, and while maintaining said bed of filler at the preheating temperature, adding said quantity of molten parent metal.

6. The method of claim 3 wherein said quantity of parent metal added comprises a material selected from the group consisting of a powder, granules, particles and mixtures thereof.

7. The method of claims 1, 2, 3, 4, or 6 wherein the pattern material is selected from the group consisting of polystyrenes, polyurethane foams, expendable grade wax, and mixtures thereof.

8. The method of claims 1, 2, 3, 4, or 6 wherein said oxidant comprises a vapor-phase oxidant.

9. The method of claim 8 wherein said oxidant comprises an oxygen-containing gas.

10. The method of claim 8 wherein said oxidant comprises a nitrogen-containing gas.

11. The method of claim 8 wherein said oxidant is air.

12. The method of claim 8 wherein said oxidant comprises forming gas.

13. The method of claims 1, 2, 3, 4, or 6 wherein said parent metal comprises an aluminum parent metal.

14. The method of claim 1, 2, 3, 4, or 6 wherein said oxidant is a solid or a liquid at said temperature.

15. The method of claim 14 wherein said oxidant is selected from the group consisting of silica, boron and a compound reducible by the parent metal.

16. The method of claim 1, 2, 3, 4, or 6 wherein said parent metal comprises a metal selected from the group consisting of silicon, titanium, tin, zinconium and hafnium.

17. The method of claims 1, 2, 3, 4, or 6 wherein said oxidant comprises a material selected from the group consisting of an oxygen-containing gas, a nitrogen-containing gas, a halogen, sulphur, phosphorus, arsenic, carbon, boron, selenium, tellurium, compounds and mixtures thereof, methane, ethane, propane, acetylene, ethylene, propylene, a $CO/CO_2$ mixture, an $H_2/H_2O$ mixture, air and mixtures thereof.

18. The method of claims 1, 2, 3, 4, or 6 wherein said filler comprises a material selected from the group consisting of hollow bodies, particulates, powder, fibers, whiskers, spheres, bubbles, steel wool, aggregate, wires, platelets, pellets, refractory fiber cloth, and mixtures thereof.

19. The method of claim 18 wherein said filler includes a material selected from the group consisting of silica, silicon carbide, alumina, zirconia, and mixtures thereof.

20. The method of claims 1, 2, 3, 4, or 6 wherein said filler includes a solid oxidant or a liquid oxidant as a component thereof.

21. The method of claims 1, 2, 3, 4, or 6 wherein said parent metal comprises an aluminum parent metal, said oxidant comprises an oxygen-containing gas and said temperature is from about 850° C. to about 1450° C.

22. The method of claims 1, 2, 3, 4, or 6 including using at least one dopant material in conjunction with said parent metal.

23. The method of claim 22 wherein said dopant comprises a source of at least two materials selected from the group of materials consisting of magnesium, zinc, siliconium germanium, tin, lead, boron, sodium, lithium, calcium, phosphorus, yttrium, and a rare earth metal.

24. The method of claim 23 wherein said rare earth metal comprises a material selected from the group consisting of lanthanum, cerium, praseodymium, neodymium and samarium.

25. The method of claim 22 wherein said parent metal comprises aluminum, said dopant comprises a source of magnesium and silicon and said oxidant comprises air.

26. The method of claim 1, 2, 3, 4, or 6 including providing at least one dopant material at least partially within said filler.

27. The method of claims 1, 2, 3, 4, or 6 including incorporating a bonding agent into said filler, at least in said support zone thereof.

* * * * *

UNITED STATES PATENT AND TRADEMARK OFFICE
CERTIFICATE OF CORRECTION

PATENT NO. : 4,818,454

DATED : April 4, 1989

INVENTOR(S) : Andrew W. Urquhart et al.

It is certified that error appears in the above-identified patent and that said Letters Patent is hereby corrected as shown below:

Column 1, line 23, after "1986" insert --,--;
          line 31, "thus" should read --Thus--;
          line 35, "phenomeon" should read --phenomenon--.
Column 2, line 29, "inserting" should read --sintering--;
          line 59, "wihch" should read --which--.
Column 3, line 14, after "ten" insert --metal--;
          line 42, "expandable" should read --expendable--;
          line 48, "containing" should read --contained--.
Column 5, line 32, "of" should read --or--.
Column 8, line 18, "imersion" should read --immersion--.
Column 10, line 14, "suport" should read --support--.
Column 11, line 30, "dimesnions" should read --dimensions--;
          line 55, "paris" should read --Paris--.
Column 13, line 5, after "Alternatively" insert --,--;
          line 59, "filter" should read --filler--.
Column 14, line 18, "iclude" should read --include--;
          line 30, delete "a";
          line 37, "through out" should read --throughout--;
          line 55, "expandable" should read --expendable--;
          line 65, "dpoant" should read --dopant--.

UNITED STATES PATENT AND TRADEMARK OFFICE
CERTIFICATE OF CORRECTION

PATENT NO. : 4,818,454

DATED : April 4, 1989

INVENTOR(S) : Andrew W. Urquhart et al.

It is certified that error appears in the above-identified patent and that said Letters Patent is hereby corrected as shown below:

Column 15, line 22, after "growth" insert --,--;
          line 23, replace "," with --for--;
          line 38, "alloyng" should read --alloying--.
Column 16, line 11, "expandable" should read --expendable--;
          line 53, "Plaster" should read --plaster--.
Column 19, line 19, "zinconium" should read --zirconium--.
Column 20, line 18, "siliconium" should read --silicon--.

Signed and Sealed this

Seventeenth Day of December, 1991

Attest:

HARRY F. MANBECK, JR.

Attesting Officer     Commissioner of Patents and Trademarks